(12) United States Patent
Khalifa et al.

(10) Patent No.: US 12,510,865 B2
(45) Date of Patent: Dec. 30, 2025

(54) APPARATUS FOR WRIST-WORN DEVICES

(71) Applicant: Bootstrap Brands, Inc., Durham, NC (US)

(72) Inventors: Aly Khalifa, Raleigh, NC (US); Fredrik Perman, Raleigh, NC (US); Mary Lee Mebane, Charlotte, NC (US); John Mebane, Durham, NC (US)

(73) Assignee: Bootstrap Brands, Inc., Durham, NC (US)

( * ) Notice: Subject to any disclaimer, the term of this patent is extended or adjusted under 35 U.S.C. 154(b) by 0 days.

(21) Appl. No.: 18/671,699

(22) Filed: May 22, 2024

(65) Prior Publication Data

US 2024/0310788 A1    Sep. 19, 2024

Related U.S. Application Data

(63) Continuation of application No. 17/362,572, filed on Jun. 29, 2021, now Pat. No. 12,025,956.

(51) Int. Cl.
  *G04B 47/00* (2006.01)
  *G02B 25/00* (2006.01)
(52) U.S. Cl.
  CPC ............ *G04B 47/00* (2013.01); *G02B 25/002* (2013.01)
(58) Field of Classification Search
  CPC .. G04B 47/00; G04B 37/0016; G02B 25/002; A45C 11/10; A45C 11/12
  USPC ......... 368/10, 314, 278, 277, 283, 286, 282; 968/372, 398
  See application file for complete search history.

(56) References Cited

U.S. PATENT DOCUMENTS

| | | | |
|---|---|---|---|
| 2,158,155 A * | 5/1939 | Roy | A45C 11/10 |
| | | | 220/DIG. 26 |
| 2,635,416 A | 4/1953 | Mietchen | |
| 2,679,785 A * | 6/1954 | Batt | G04B 39/008 |
| | | | 359/809 |
| 4,451,117 A | 5/1984 | Goode | |
| 5,566,137 A | 10/1996 | Chevroulet et al. | |
| 5,652,736 A * | 7/1997 | Lee | G04B 37/0016 |
| | | | 368/286 |
| 5,923,623 A * | 7/1999 | Lee | G04B 37/0016 |
| | | | 368/286 |
| 6,275,333 B1 | 8/2001 | Shaffer | |
| 7,274,521 B2 | 9/2007 | Compton | |
| 8,328,055 B1 | 12/2012 | Snyder | |
| 8,681,437 B2 | 3/2014 | Jaffee | |
| 9,529,337 B2 | 12/2016 | Sagardoyburu | |

(Continued)

FOREIGN PATENT DOCUMENTS

| | | | |
|---|---|---|---|
| CN | 210573237 U | * | 5/2020 |
| EP | 1074190 A2 | | 2/2001 |
| WO | 2016125847 A1 | | 8/2016 |

*Primary Examiner* — Regis J Betsch
*Assistant Examiner* — Kevin Andrew Johnston
(74) *Attorney, Agent, or Firm* — Myers Bigel, P.A.

(57) ABSTRACT

An apparatus for a wrist-worn device includes a frame and a screen fixed to the frame. The frame is configured to be removably secured to the wrist-worn device so that the screen is positioned in adjacent, overlying relationship with a face of the wrist-worn device. The screen is configured to perform one or more of the following: magnify the face of the wrist-worn device, protect the face of the wrist-worn device, provide an anti-glare surface for the face of the wrist-worn device, and provide a privacy screen for the face of the wrist-worn device.

13 Claims, 9 Drawing Sheets

(56) References Cited

U.S. PATENT DOCUMENTS

| | | | |
|---|---|---|---|
| 10,509,366 B2* | 12/2019 | Godoy | G04B 43/002 |
| 2004/0151077 A1* | 8/2004 | McKay | G04B 47/00 |
| | | | 368/278 |
| 2006/0062090 A1 | 3/2006 | Ast et al. | |
| 2007/0189127 A1* | 8/2007 | Pollak | G04B 45/0084 |
| | | | 368/294 |
| 2007/0229989 A1 | 10/2007 | Scott et al. | |
| 2012/0243110 A1 | 9/2012 | Robinson | |
| 2013/0021881 A1* | 1/2013 | Bertucci | G04B 43/002 |
| | | | 368/286 |
| 2015/0137731 A1 | 5/2015 | Kim | |
| 2016/0216694 A1* | 7/2016 | Kneebusch | G04G 17/08 |
| 2016/0274544 A1 | 9/2016 | Counas | |
| 2017/0000223 A1* | 1/2017 | Kim | A44C 5/24 |
| 2017/0248922 A1 | 8/2017 | Hynecek | |
| 2020/0387001 A1 | 12/2020 | Cavalca et al. | |

\* cited by examiner

APPARATUS FOR WRIST-WORN DEVICES

RELATED APPLICATION

This application is a continuation application of pending U.S. patent application Ser. No. 17/362,572, filed Jun. 29, 2021, the disclosure of which is incorporated herein by reference as if set forth in its entirety.

FIELD OF THE INVENTION

The present invention relates generally to wearable devices and, more particularly, to devices worn on the wrist.

BACKGROUND OF THE INVENTION

Many people become farsighted with age, making it difficult for them to read an ordinary wristwatch without glasses. As such, there is a need for a magnification device that can allow people to read a wristwatch, as well as other wrist-worn devices, without glasses.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an apparatus for a wrist-worn device includes a frame and a screen fixed to the frame. The frame is configured to be removably secured to the wrist-worn device so that the screen is positioned in adjacent, overlying relationship with a face of the wrist-worn device. The screen is configured to perform one or more of the following functions: magnify the face of the wrist-worn device, protect the face of the wrist-worn device, provide an anti-glare surface for the face of the wrist-worn device, and provide a privacy screen for the face of the wrist-worn device.

According to some embodiments of the present invention, an apparatus for a wrist-worn device having a band adapted to be fitted to a wrist of a user includes a frame, a screen fixed to the frame, and a pair of band attachment members. Each band attachment member is configured to be secured to the band on respective opposing portions of the wrist-worn device. The frame is configured to be removably secured to the band attachment members such that the screen is positioned in adjacent, overlying relationship with a face of the wrist-worn device. The screen is configured to perform one or more of the following functions: magnify the face of the wrist-worn device, protect the face of the wrist-worn device, provide an anti-glare surface for the face of the wrist-worn device, and provide a privacy screen for the face of the wrist-worn device.

According to some embodiments of the present invention, an apparatus for a wrist-worn device includes a frame and a screen fixed to the frame. The frame is configured to be removably secured to the wrist-worn device so that the screen is positioned in adjacent, overlying relationship with a face of the wrist-worn device. The frame is configured such that user controls of the wrist-worn device are accessible when the frame is secured to the wrist worn device. The screen is configured to perform one or more of the following functions: magnify the face of the wrist-worn device, protect the face of the wrist-worn device, provide an anti-glare surface for the face of the wrist-worn device, and provide a privacy screen for the face of the wrist-worn device.

According to some embodiments of the present invention, an apparatus for a wrist-worn device includes a frame having first and second portions. A screen is fixed to the frame first portion, and the frame second portion is configured to be removably secured to the wrist-worn device. The frame first portion is slidably secured to the frame second portion such that the screen can be moved between a first position in adjacent, overlying relationship with a face of the wrist-worn device and a second position away from the face of the wrist-worn device. The screen is configured to perform one or more of the following functions: magnify the face of the wrist-worn device, protect the face of the wrist-worn device, provide an anti-glare surface for the face of the wrist-worn device, and provide a privacy screen for the face of the wrist-worn device.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

The terms "about" and "approximately", as used herein with respect to a value or number, means that the value or number can vary by +/− twenty percent (20%).

Referring initially to FIGS. 1-4, an apparatus 100 for a wrist-worn device 10, such as a watch, is illustrated. The wrist-worn device 10 includes a housing 12 formed of a suitable material, such as plastic or metal, and a face 14 configured to be viewed by a user. The housing 12 includes opposing portions 12a, 12b (FIG. 2) to which are attached respective portions 16a, 16b of a band 16 that is adapted to retain the wrist-worn device 10 around a user's wrist. The illustrated band 16 is adjustable so that the band 16 can be selectively loosened or tightened, as conventional. The band 16 may also be a single continuous band, rather than two separate portions. The band 16 may be formed from a variety of materials including, but not limited to, fabric, metal, plastic, leather, etc.

Figure 1:
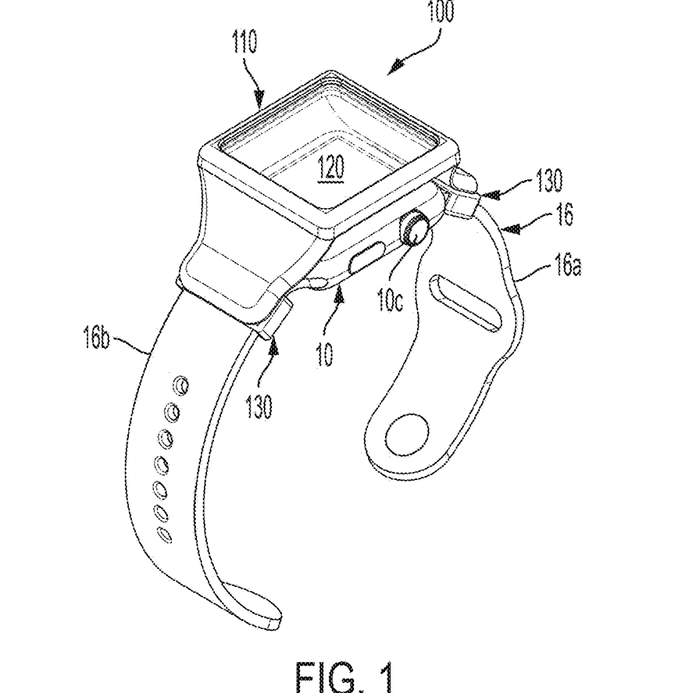
FIG. 1 is a top perspective view of a magnifying apparatus for a wrist-worn device, such as a watch, according to some embodiments of the present invention.
Figure 2:
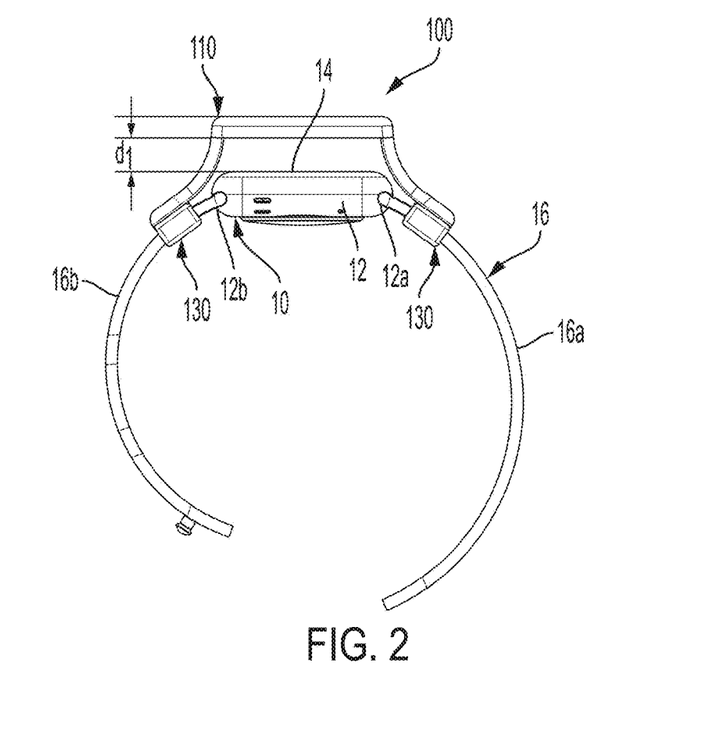
FIG. 2 is a side view of the magnifying apparatus of FIG. 1.
Figure 3:
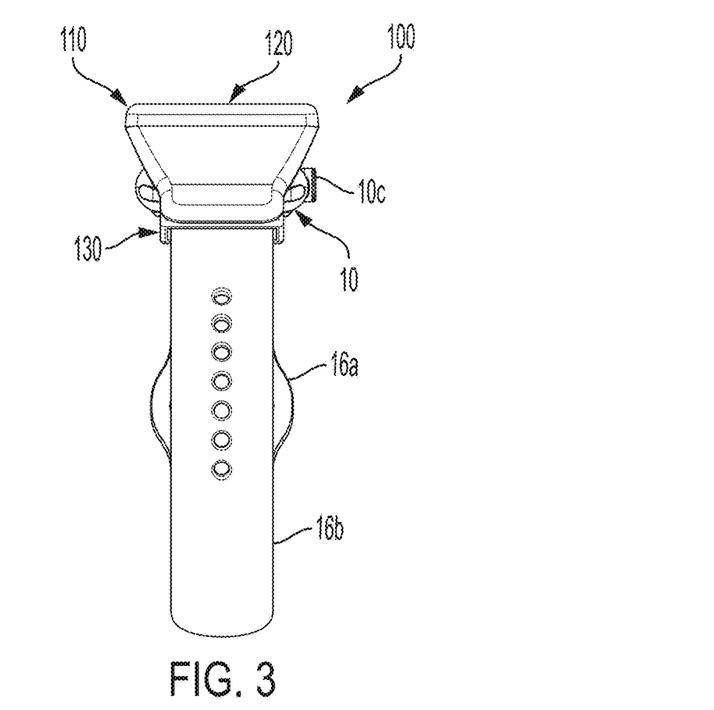
FIG. 3 is an end view of the magnifying apparatus of FIG. 1.
Figure 4:
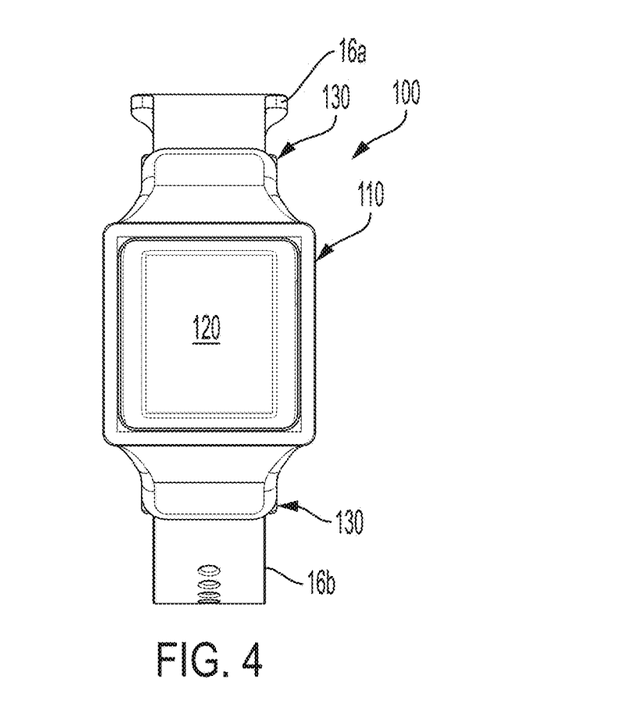
FIG. 4 is a top plan view of the magnifying apparatus of FIG. 1.

The apparatus 100 includes a frame 110 and a screen 120 fixed to the frame 110. The frame 110 is configured to be removably secured to the wrist-worn device 10 so that the screen 120 is positioned in adjacent, overlying relationship with the face 14 of the wrist-worn device 10. As illustrated in FIG. 2, the frame 110 is configured such that the screen 120 overlies the face 14 in spaced-apart relationship. For example, the screen 120 may be spaced apart from the face by a distance di of between about 1.0 mm and about 10.0 mm; however, the screen 120 may be spaced apart by other distances as well. In other embodiments, the frame 110 may be configured such that the screen 120 is in face-to-face contacting relationship with the face 14. The frame 110 is also configured such that user controls 10c of the wrist-worn device 10 are accessible to a user when the frame is secured to the wrist-worn device 10.

The screen 120 may be formed of an optically clear material, such as glass or clear plastic, and may have various tints/colors, designs, etc. The screen 120 is sized to substantially conform to the shape of the face 14, but it may take many shapes, without limitation. For example, in some embodiments, the screen 120 may have the exact same shape as the face 14. However, in other embodiments, the screen 120 may have a slightly smaller shape than the face 14, or may have a slightly larger shape than the face 14.

The screen 120 may be a magnifying lens that is configured to magnify the face 14 of the wrist-worn device 10. The magnifying lens may provide a predetermined degree of magnification, as would be understood by one of skill in the art. For example, one or both sides of the lens may have convex surfaces. Other magnifying lens configurations are possible, including, but not limited to, a lens with a convex surface on only one side, a lens with a both a convex and a concave side, and a lens in which one side is substantially planar. Furthermore, the magnifying lens could be a prescription eyeglass lens.

The screen 120 may perform other functions in addition to or in place of magnification. For example, the screen may be configured to perform one or more of the following functions: protect the face 14 of the wrist-worn device 10, provide an anti-glare surface for the face 14 of the wrist-worn device 10, and provide a privacy screen for the face 14 of the wrist-worn device 10. For example, the screen 120 may have a configuration such that the face of the wrist-worn device 10 cannot be viewed from an angle by others. For example, the screen 120 may be configured to alter the transmission of light therethrough such that only the person wearing the device 10 can view the face of the device 10. This may be accomplished, for example, by the screen 120 being configured to polarize light passing therethrough. Other technologies may be utilized, as well.

Figure 5:
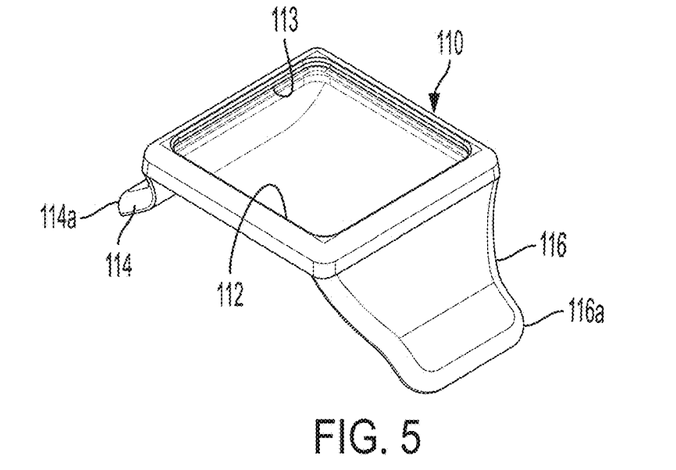
FIG. 5 is a top perspective view of the frame of the magnifying apparatus of FIG. 1.
Figure 6:
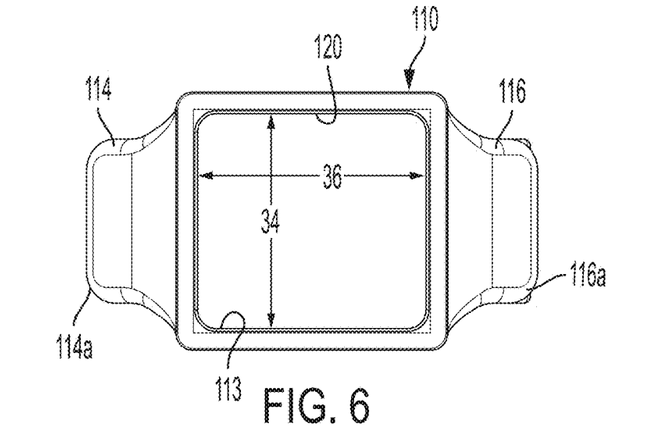
FIG. 6 is a top plan view of the frame of FIG. 5.

Referring to FIG. 5, the frame 110 includes a central opening 112 and opposing first and second arms 114, 116. The screen 120 is secured within the central opening 112 of the frame 112 via a groove 113 formed in the frame 110 at the periphery of the central opening 112 in a conventional manner. However, various ways of securing the screen 120 within the opening 112 of the frame 110 may be utilized.

As will be described below, the first and second arms 114, 116 are configured to releasably couple with band attachment members 130 such that the apparatus 100 can be utilized when needed and removed from the wrist-worn device 10 when not needed. The frame 110 may be formed from a variety of materials, and typically is formed from a lightweight plastic or metal material. The illustrated first and second arms 114, 116 have an arcuate configuration which allows a distal end portion 114a, 116a of each arm 114, 116 to properly engage with a respective band attachment member 130 as illustrated in FIG. 2. However, embodiments of the present invention are not limited to the illustrated shape and configuration of the frame 110 and the first and second arms 114, 116. Various other shapes and configurations for both the frame 110 and the arms 114, 116 are possible.

Figure 12:
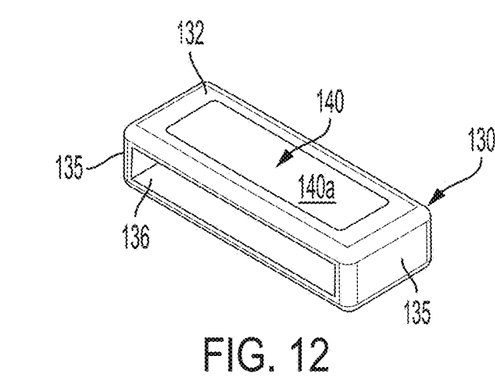
FIG. 12 is a top perspective view of one of the band attachment members of the magnifying apparatus of FIG. 1.
Figure 13:
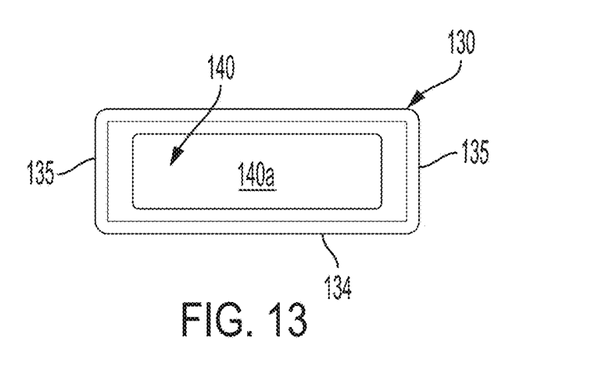
FIG. 13 is a top plan view of the band attachment member of FIG. 12.
Figure 14:
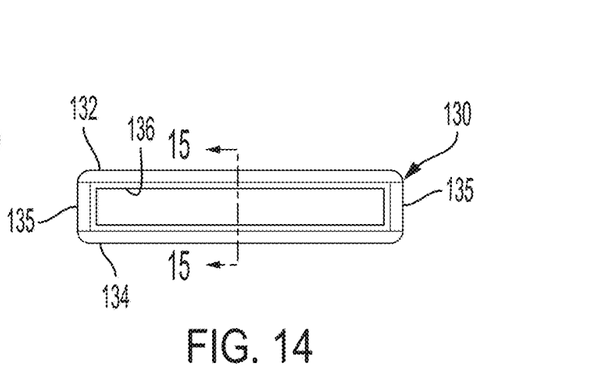
FIG. 14 is a side view of the band attachment member of FIG. 12.

The illustrated apparatus 100 includes a pair of band attachment members 130. Each band attachment member 130 is configured to be secured to the band 116 adjacent a respective one of the housing end portions 12a, 12b, as illustrated in FIGS. 1-2. In the illustrated embodiment, each band attachment member 130 has a generally rectangular shape with opposite upper and lower surfaces 132, 134, and opposite ends 135 (FIG. 12). However, embodiments of the present invention are not limited to the illustrated shape of the band attachment members 130. The band attachment members 130 may have various shapes and sizes.

As illustrated in FIGS. 12-15, each band attachment member 130 includes a passageway 136 that is sized and configured to slidably receive a respective portion of the wrist-worn device band 16 therethrough. For example, as illustrated in FIGS. 1-4, one band attachment member 130 is slidably received on the first band portion 16a, and the other band attachment member 130 is slidably received on the second band portion 16b. The passageway 136 may be sized such that a relatively snug fit is achieved with the respective band portion 16a, 16b received therein. As such, the band attachment members 130 may be retained in place on the band 16 when the frame 110 is not engaged therewith.

Figure 15:
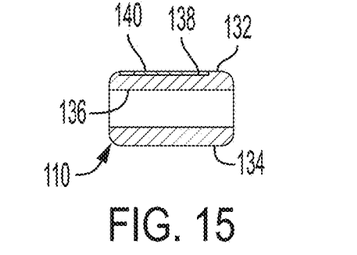
FIG. 15 is a cross-sectional view of the band attachment member of FIG. 14 taken along line 15-15.

In the illustrated embodiment, each band attachment member 130 includes a surface-adhering element 140 secured to the upper surface 132 thereof. In some embodiments, the surface-adhering element 140 is a magnetic element. In other embodiments, the surface-adhering element 140 is a hook/loop element. The surface-adhering element 140 may be an adhesive-type material, as well. As illustrated in FIG. 15, the upper surface 132 of each band attachment member 130 includes a recessed portion 138 therein. The surface adhering 20) element 140 is secured within the recessed portion 138 such that an external surface 140a of the surface adhering element 140 is substantially flush with the band attachment member upper surface 132 (FIG. 15). Although a single surface-adhering element 140 is illustrated, it is understood that multiple surface-adhering elements could be utilized in each band attachment member 130. Moreover, the surface-adhering element 140 can have various shapes and configurations and is not limited to the illustrated shape.

Figure 7:
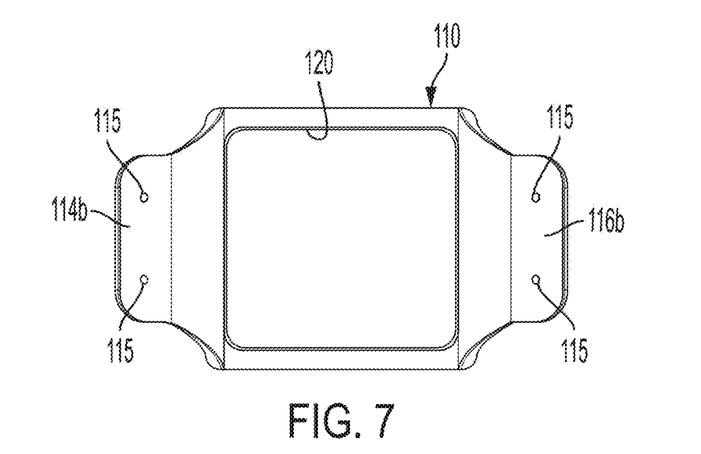
FIG. 7 is a bottom plan view of the frame of FIG. 5.
Figure 8:
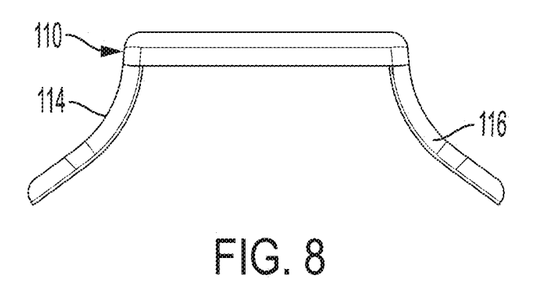
FIG. 8 is a side view of the frame of FIG. 5.
Figure 9:
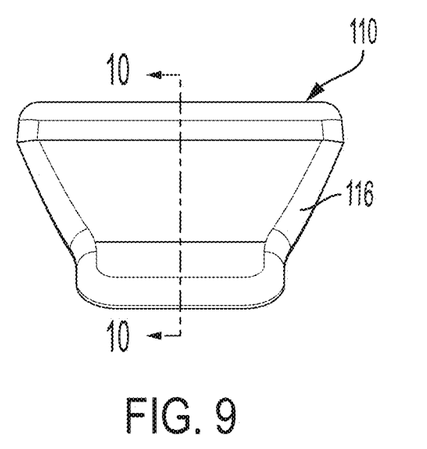
FIG. 9 is an end view top plan view of the frame of FIG. 5.
Figure 10:
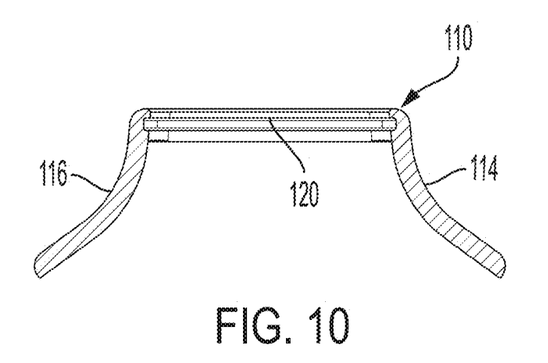
FIG. 10 is a cross-sectional view of the frame of FIG. 9 taken along line 10-10.
Figure 11:
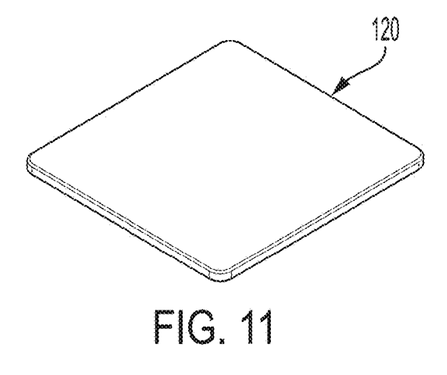
FIG. 11 is a top perspective view of the magnifying lens of the magnifying apparatus of FIG. 1.

The first and second arms 114, 116 of the frame 110 are configured to releasably couple to the band attachment members 130. For example, as illustrated in FIG. 7, the lower surface 114b, 116b of the distal end of each arm 114, 116 includes a pair of elements 115 (e.g., magnetic elements, hook/loop elements, etc.) in spaced-apart relationship. Although two elements 115 are illustrated, it is understood that a single element 115 could be utilized, or more than two elements 115 could be utilized. To releasably secure the frame 110 to the wrist-worn device, the frame 110 is oriented such that the distal end portion 114a, 116a of each arm 114, 116 engages the upper surface 132 of a respective one of the band attachment members 130.

In other embodiments, the frame 110 may be configured to be attached directly to the housing of a wrist-worn device. For example, the arms 114, 116 of the frame 110 may have a different configuration that allows them to be directly attached to the housing. Alternatively, additional magnetic elements may be provided in the arms 114, 116 at other locations and configured to magnetically couple with a metal housing of a wrist-worn device.

Figure 16A:
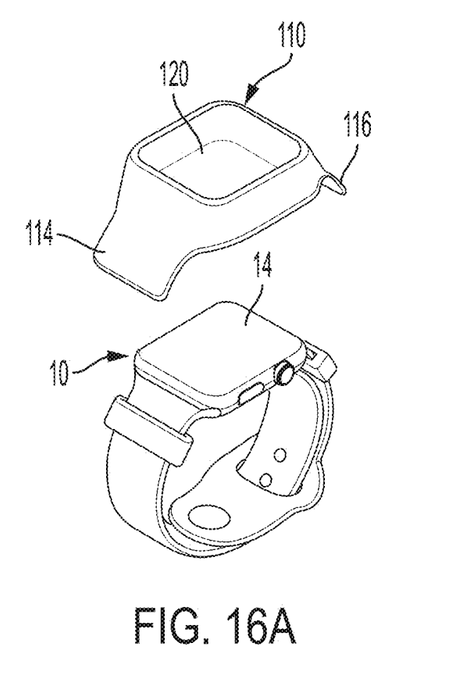
FIGS. 16A-16C illustrate an embodiment of the present invention where the frame includes a hinge that allows the frame to be pivoted away from the face of the wrist-worn device.
Figure 16B:
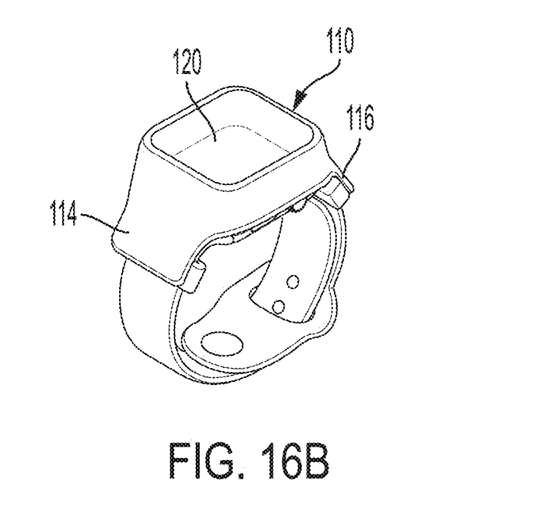
Figure 16C:
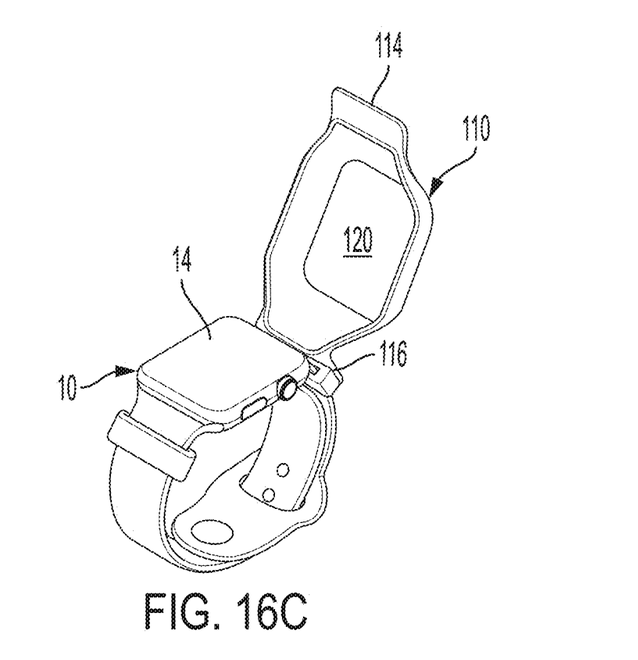

FIGS. 16A-16C illustrate an embodiment of the present invention where one of the first or second arms 114, 116 of the frame 110 is configured as a hinge that allows the frame 110 to be pivoted away from the face 14 of the wrist-worn device 10 when desired. In the illustrated embodiment, arm 116 is configured as a hinge. Various types and numbers of hinges may be utilized, and embodiments of the present invention are not limited to the embodiment illustrated in FIGS. 16A-16C.

Figure 17A:
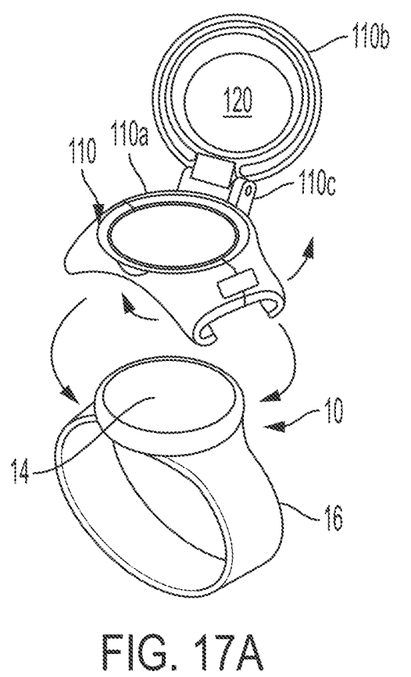
FIGS. 17A-17B illustrate an embodiment of the present invention where the frame includes a hinge that allows a portion of the frame with the screen to be pivoted away from the face of the wrist-worn device.
Figure 17B:
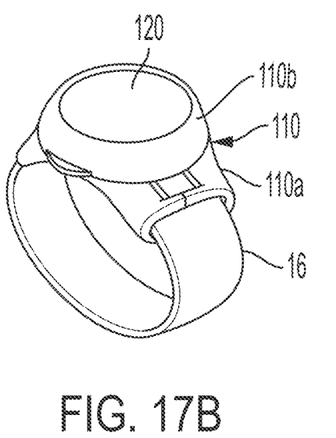

FIGS. 17A-17B illustrate an embodiment of the present invention where the frame 110 is configured to have two portions 110a, 110b that are connected by a hinge 110c. Frame portion 110b contains the screen 120 and is configured to be pivoted away from the face 14 of the wrist-worn device 10 when desired. The illustrated frame 110 is also configured to be attached to the band 16 without the use of separate band attachment members.

Figure 18A:
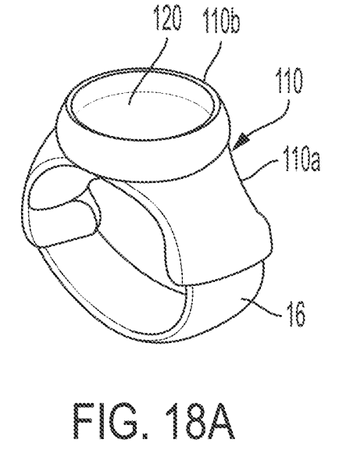
FIGS. 18A-18B illustrate an embodiment of the present invention where the frame has two portions that are removably secured to each other.
Figure 18B:
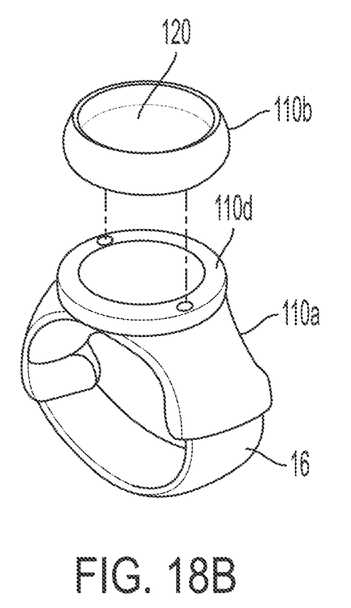

FIGS. 18A-18B illustrate an embodiment of the present invention where the frame 110 is configured to have two portions 110a, 110b that are removably secured to each other. Frame portion 110b contains the screen 120 and is configured to be releasably secured to an upper portion 110d of the frame first portion 110a. The frame portion 110b may be releasably secured to the frame first portion in a variety of ways, such as magnetically, adhesively, and/or via mechanical connection. As such, the screen 120 can be removed from the face 14 of the wrist-worn device 10 when desired. The illustrated frame 110 is also configured to be attached to the band 16 without the use of separate band attachment members.

Figure 19A:
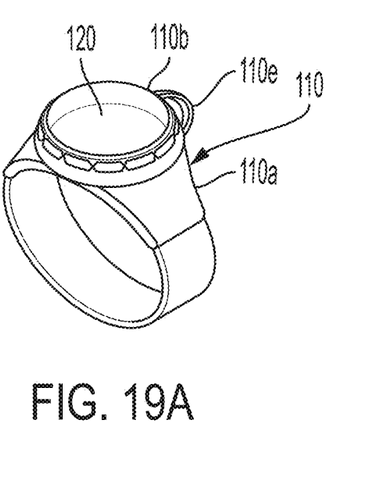
FIGS. 19A-19B illustrate an embodiment of the present invention where the frame has two portions that are removably secured to each other.
Figure 19B:
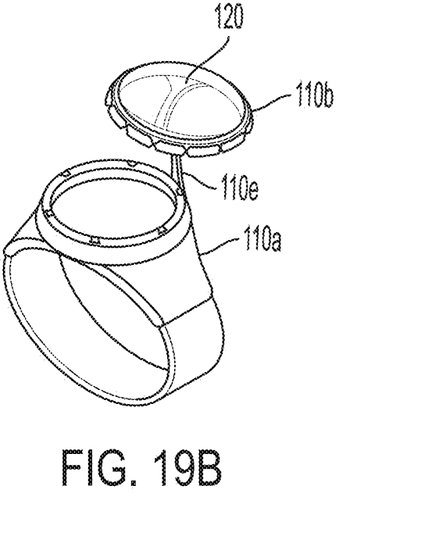

FIGS. 19A-19B illustrate an embodiment of the present invention where the frame 110 is configured to have two portions 110a, 110b that are removably secured to each other. Frame portion 110b contains the screen 120 and is configured to be releasably secured to an upper portion 110d of the frame first portion 110a. As such, the screen 120 can be removed from the face 14 of the wrist-worn device 10 when desired. The frame portions 110a and 110b are tethered to each other via a flexible member 110e.

Figure 20A:
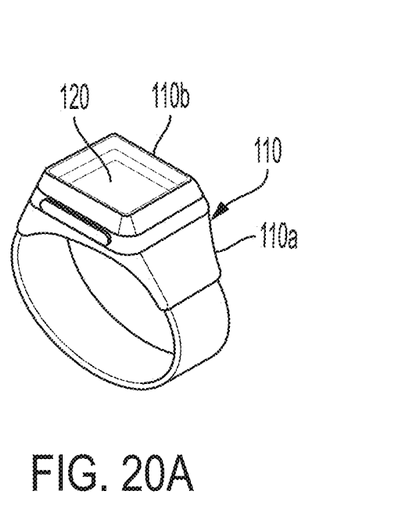
FIGS. 20A-20B illustrate an embodiment of the present invention where the frame has two portions that are connected by a hinge and that allows the screen to be pivoted away from the face of the wrist-worn device.
Figure 20B:
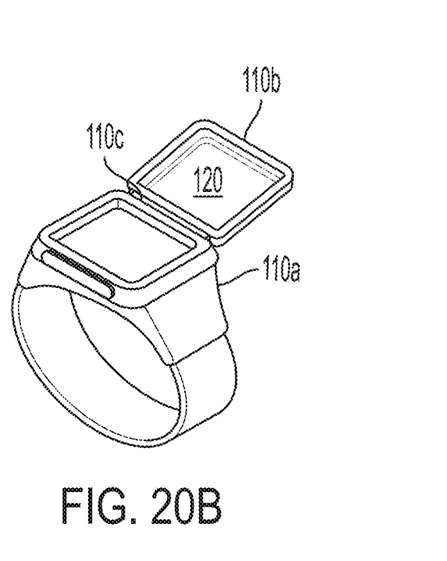

FIGS. 20A-20B illustrate an embodiment of the present invention where the frame 110 is configured to have two portions 110a, 110b that are connected by a hinge 110c. Frame portion 110b contains the screen 120 and is configured to be pivoted away from the face 14 of the wrist-worn device 10 when desired.

Figure 21A:
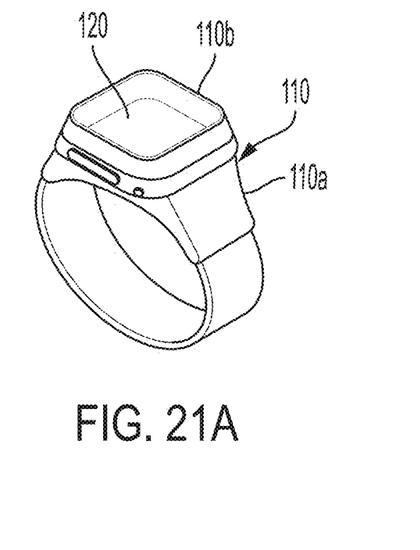
FIGS. 21A-21B illustrate an embodiment of the present invention where the frame has two portions that are slidably secured to each other and that allow the screen to be moved away from the face of the wrist-worn device.
Figure 21B:
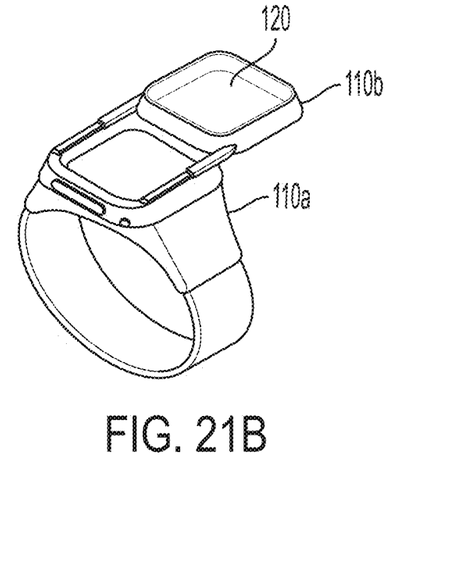

FIGS. 21A-21B illustrate an embodiment of the present invention where the frame 110 is configured to have two portions 110a, 110b that are slidably secured to each other. Frame portion 110b contains the screen 120 and is configured to moved away from the face 14 of the wrist-worn device 10 when desired.

Figure 22A:
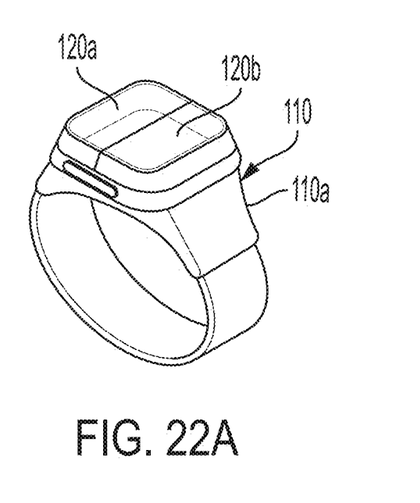
FIGS. 22A-22B illustrate an embodiment of the present invention where the screen has two portions that can be moved away from the face of the wrist-worn device.
Figure 22B:
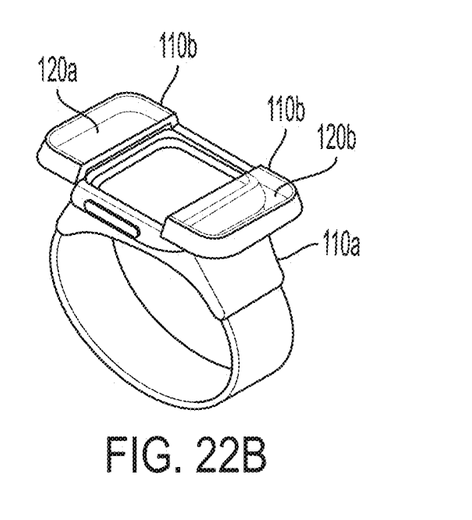

FIGS. 22A-22B illustrate an embodiment of the present invention similar to that shown in FIGS. 21A, 21B, but where the screen 120 has two portions 120a, 120b that are slidably secured to the frame portion 110a. The frame portion 110b also has two portions, each containing a respective screen portion 120a, 120b, as illustrated.

Embodiments of the present invention can be used with any type of wrist-worn device having a face that is viewed by a user. For example, in addition to watches, other wrist-worn devices that embodiments of the present invention may be used with include, but are not limited to, exercise monitoring devices, physiological monitoring devices, etc. Moreover, embodiments of the present invention may be utilized with any form of digital and/or analog wrist watch.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. An apparatus for a wrist-worn device, the apparatus comprising:
a frame comprising first and second portions; and
a screen secured within an opening of the frame first portion, wherein the screen is configured to polarize light passing therethrough, wherein the frame second portion is configured to be removably secured directly to the wrist-worn device without any separate attachment members and such that a central opening of the frame second portion is in overlying relationship with a face of the wrist-worn device, and wherein the frame first portion is pivotably secured to the frame second portion such that the screen can be moved between a first position in adjacent, overlying relationship with the central opening of the frame second portion and the face of the wrist-worn device and a second position away from the central opening of the frame second portion and the face of the wrist-worn device, wherein the central opening of the frame second portion and the frame first portion are on a same side of the face of the wrist-worn device when the frame second portion is removably secured to the wrist-worn device and the screen is in the first position.

2. The apparatus of claim 1, wherein the screen is a magnifying lens configured to magnify the face of the wrist-worn device when the screen is in the first position.

3. The apparatus of claim 2, wherein the magnifying lens is a prescription eyeglass lens.

4. The apparatus of claim 1, wherein the frame comprises at least one hinge member that allows the frame first portion to be pivoted away from the frame second portion and the face of the wrist-worn device.

5. The apparatus of claim 1, wherein the wrist-worn device comprises a band adapted to be fitted to a wrist of a user, and wherein the frame second portion comprises first and second arms on opposite sides of the central opening of the frame second portion that are configured to engage respective portions of lateral edges of the band so as to removably secure the frame directly to the wrist-worn device.

6. The apparatus of claim 5, wherein the first and second arms are configured to be in direct contact with an outer surface of the band and in direct contact with the lateral edges of the band.

7. The apparatus of claim 5, wherein the first and second arms each have opposing, elongate arcuate edge portions that are configured to engage the respective portions of the lateral edges of the band.

8. The apparatus of claim 7, wherein the elongate arcuate edge portions of the first and second arms are configured to be in direct contact with the portions of the lateral edges of the band.

9. The apparatus of claim 1, wherein the screen has a shape that substantially corresponds with a shape of the wrist-worn device face.

10. The apparatus of claim 1, wherein the screen comprises an optically clear polymer.

11. The apparatus of claim 1, wherein the wrist-worn device is a watch.

12. The apparatus of claim 1, wherein the central opening of the frame second portion is positioned between the face of the wrist-worn device and the screen when the frame second portion is removably secured to the wrist-worn device and the screen is in the first position.

13. The apparatus of claim 1, wherein the screen is configured to alter transmission of light therethrough.

* * * * *